United States Patent
Cherukumudi et al.

(10) Patent No.: US 7,577,648 B1
(45) Date of Patent: Aug. 18, 2009

(54) DIRECTORY ACCESS EXTENSION FRAMEWORK

(75) Inventors: Vijaykumar Cherukumudi, Overland Park, KS (US); Shrikant D. Jannu, Frisco, TX (US); David K. Fultz, Raymore, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 421 days.

(21) Appl. No.: 11/536,664

(22) Filed: Sep. 29, 2006

(51) Int. Cl.
*G06F 7/00* (2006.01)
(52) U.S. Cl. .......................... 707/4; 707/102
(58) Field of Classification Search ......... 707/100–102, 707/1–6
See application file for complete search history.

(56) References Cited

U.S. PATENT DOCUMENTS

2001/0034733 A1* 10/2001 Prompt et al. ............... 707/102

* cited by examiner

Primary Examiner—Wilson Lee

(57) ABSTRACT

Disclosed herein is a Directory Extension Service (DES) system and method for generating a count of a number of entries in a node or a number of entries in a node and any nested nodes in one or more directory databases. The Directory Extension Service may parse a count requests to generate one or more sets of commands to be sent to the one or more directory databases. The generated sets of commands may be particularly tailored according to proprietary operational attributes or controls supported by each vendor that implements a directory database. The count values retrieved from each of the directory databases may then be combined by the Directory Extension Service system and the resultant count value may be transparently presented to the application that has requested the count.

19 Claims, 9 Drawing Sheets

US 7,577,648 B1

DIRECTORY ACCESS EXTENSION FRAMEWORK

CROSS-REFERENCE TO RELATED APPLICATIONS

None

STATEMENT REGARDING FEDERALLY SPONSORED RESEARCH OR DEVELOPMENT

Not applicable.

REFERENCE TO A MICROFICHE APPENDIX

Not applicable.

BACKGROUND

Generating a count of a number of entries in node or a number of entries in a node and any nested nodes in a directory database is useful for a variety of reasons. One reason may be for licensing of software in an enterprise. For example, if an enterprise has a particular operating system such as MICROSOFT WINDOWS on each of its computers then a directory database may store a list of nodes corresponding to the businesses in the enterprise. Each of these nodes may contain a list of entries that may identify each of the computers in the corresponding business, the person assigned to the computer, and any other useful information as attributes of each of the entries. By counting the number of computers in each of the businesses a total number of computers in the enterprise may be determined wherein licensing fees for the operating system or other software may then be accurately assessed and paid by the enterprise.

Another reason why generating a count of entries may be important in a directory database may be to ensure efficient operation of the database. For example, a particular vendor for a directory database may know that the database works most efficiently up to a particular number of entries on each branch of a directory information tree. With that in mind, a count may be done for the number of entries on each branch in a directory database in order to ensure efficient operation. If it is found that the number of entries on a branch is too large then a new branch may be created to more evenly distribute the entries in the directory database.

Typically lightweight directory access protocol (LDAP) servers perform counts by starting at a particular base node, or context, in the directory, iteratively counting each entry in the node, and making a determination of the existence of all of the sub-nodes under the base node. For each sub-node an iterative count and determination is similarly made until the counting algorithm reaches the leaf nodes, those nodes that do not have any sub-nodes. As directory databases get large, running simple searches and counts as described above gets extremely long and/or may cause the search to crash. Further, in large enterprises there may be a plurality of directory servers, wherein each directory server may be supported by a different vendor. Currently, each directory server would have to be individually searched and counted since there is no way to centralize the search and count across the various databases. Further, each vendor may have proprietary controls or attributes that may assist in performing these counts, how- ever, there does not exist any way to utilize these proprietary features in a distributed directory environment.

SUMMARY

Disclosed herein is a system comprising a directory extension service unit configured to communicate with a client application and one or more directory data stores. The Directory Extension Service unit is further configured to translate count requests received from the client application into one or more sets of commands, wherein each set of commands corresponds to one of the directory data stores. Each directory data store is supported by one of a plurality of vendors and each set of commands is translated to utilize features of a corresponding vendor to generate a count value of a number of entries in the corresponding directory data store.

Further disclosed herein is a method comprising receiving a request for a count of a number of entries in one or more directory data stores. The request is translated into one or more sets of commands in accordance with features of each of the one or more data stores. A number of entries on each of the one or more directory data stores is counted in accordance with the corresponding set of commands. The number of entries on each of the one or more directory data stores is summed to generate the count of a total number of entries in one or more directory data stores.

Still further disclosed herein is an information carrier medium containing instructions that, when placed in operable relation to a computing device, cause the computing device to receive a request for a count of a number of entries from an application. The request is parsed to determine a set of directory data stores from which a count of entries is requested and to determine a vendor of each of the directory data stores in the set. The request is translated into one or more sets of commands in accordance with features supported by a vendor of each of the directory data stores in the set. Each of the sets of commands is sent to each of the directory data stores in the set. A count of a number of entries in each of the directory data stores in the set is received, wherein the count is performed in accordance with the corresponding set of commands. A reply is sent to the application with a sum of all of the received counts of entries.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one embodiment of the present disclosure is illustrated below, the present system may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

Disclosed herein is a Directory Extension Service system and method for generating a count of a number of entries in a node, and, if desired, any nested nodes in one or more directory data stores. The Directory Extension Service may parse count requests to generate one or more sets of commands to be sent to the one or more directory data stores. The generated sets of commands may be particularly tailored according to proprietary operational attributes or controls supported by each vendor that implements a directory data store. The count values retrieved from each of the directory data stores may then be combined by the Directory Extension Service system and the resultant count value may be transparently presented to an application or user that has requested the count. This allows for not only efficient counting by taking advantage of proprietary operational attributes or controls, but counting across multiple directory data stores that may be implemented by a plurality of different vendors.

Figure 1:
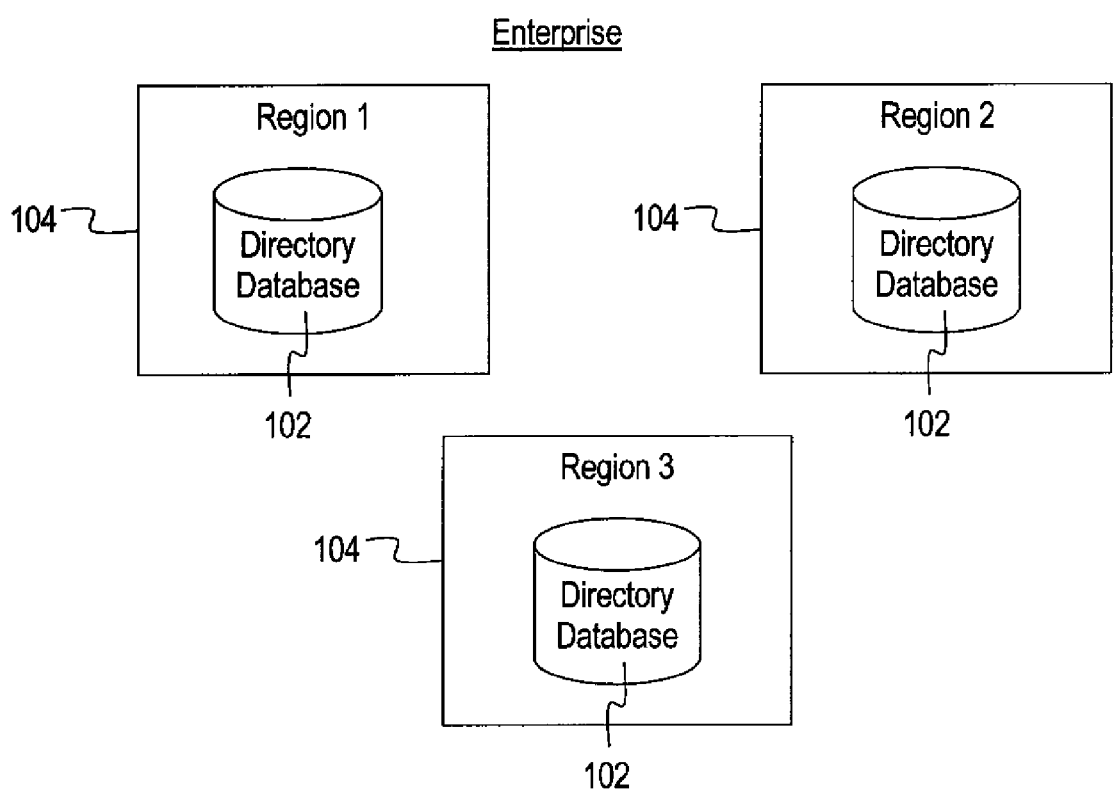
FIG. 1 shows an illustrative enterprise that maintains a plurality of directory data stores.

As shown in FIG. 1, an enterprise may have many regional offices wherein each region may have one or more directory data stores 102 for storing information relevant to the enterprise in that particular region. Each of the one or more directory data stores 102 may be any of a database, flat file, directory service, etc. The data stored in each of the directory data stores 102 may be accessed using a lightweight directory access protocol (LDAP) or any other similar directory protocol. As an example of the type of information that may be relevant to the enterprise in a particular region, each directory data store 102 may store lists of entries identifying all of the employees in the particular region. Other examples of items that may be tracked by the directory data stores include computers, equipment, inventory, offices, licenses, accounts, personal information, etc. Note that directory data stores may also be used in any suitable environment for hierarchically storing data such as at educational institutions or for government departments.

Figure 2:
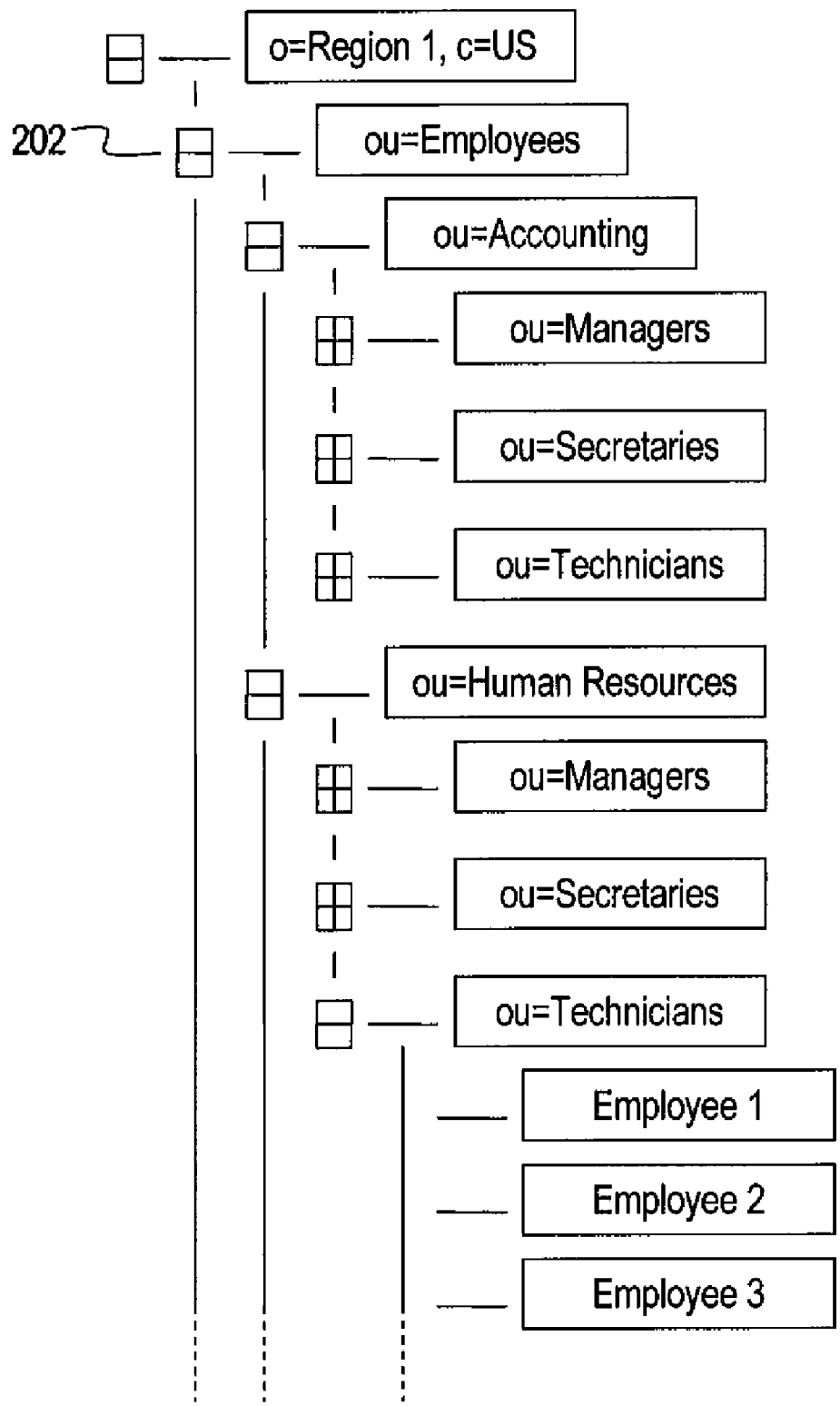
FIG. 2 shows an illustrative Directory Information Tree for the directory data store in region 1.

FIG. 2 depicts an illustrative directory information tree that may be stored in the directory data store 102 in region 1. As shown in FIG. 2 there is a node 202 for storing entries of employees in region 1. The "employees" node 202 may have a plurality of nested nodes that may each store a list of employees in a particular department such as accounting, human resources, etc. Each of the departmental nodes may further have a plurality of nested nodes that identify all of the employees that perform a particular type of job. In the example of FIG. 2 there are nested nodes that identify all of the employees under that node as a secretary, manager, technician, etc. Under each of the nodes identifying a type of job there may be a list of employee entries identifying various attributes of the employees such as an ID number, name, normal work schedule, etc. As noted in the background section of the instant disclosure, requests for count values of a number of entries in a node or a number of entries in a node and any nested nodes may be made to one or more directory data stores 102 across the enterprise for a number of reasons.

Figure 3:
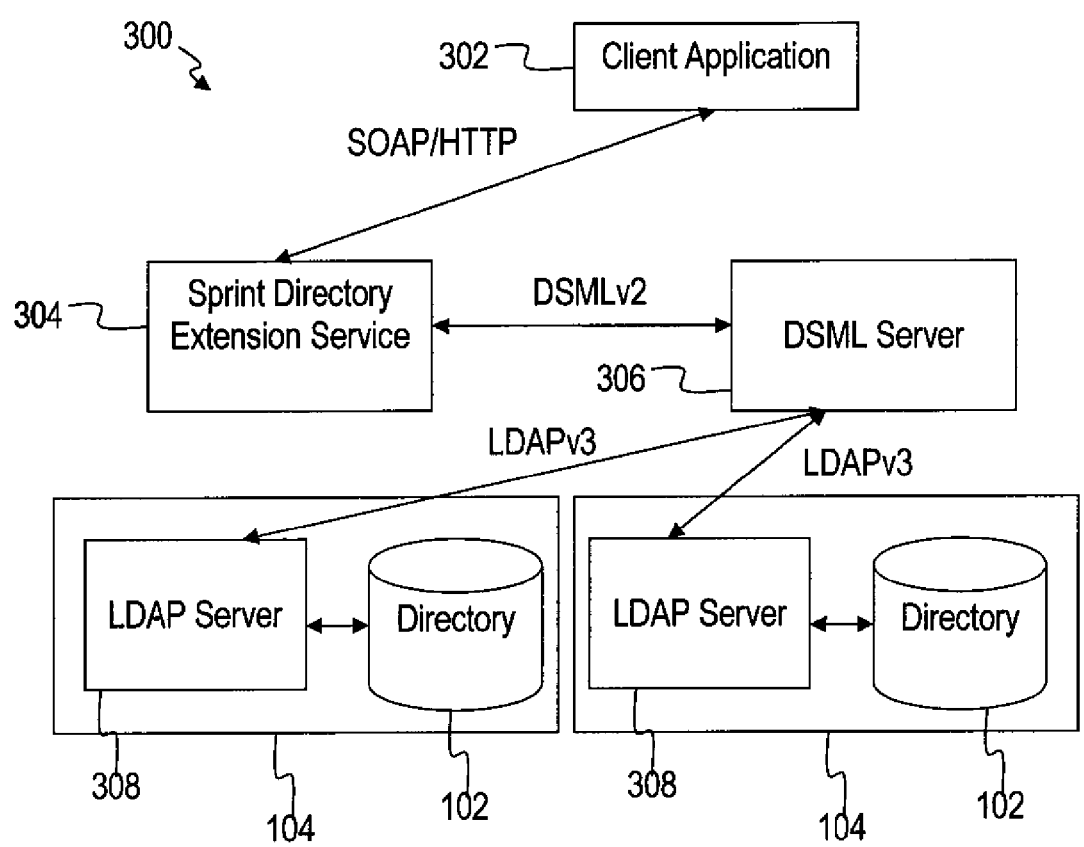
FIG. 3 shows an illustrative Directory Extension Framework.

FIG. 3 depicts an illustrative Directory Extension Framework 300 that may be used to generate count values of a number of entries in a node or a number of entries in a node and any nested nodes in a plurality of directory data stores 102. A client application 302 may be any application that may request data from any of the directory data stores 102, for example. As shown in FIG. 3, the client application communicates with the Directory Extension Service 304 through any appropriate communication means such as using the Simple Object Access Protocol (SOAP) via the Hypertext Transfer Protocol (HTTP), for example. The client application 302 may send various requests for information to the Directory Extension Service 304, such as a request for a count of the number of entries in a node. The processing of these requests by the Directory Extension Service 304 is described in detail below.

The Directory Extension Service 304 communicates with a directory service markup language (DSML) server 306 via DSMLv2, for example. The DSML server 306 operates under the control of the Directory Extension Service 304 to read and update directory information tree information in the directory data stores 102. The DSML server 306 may be used to convert the directory information tree structure into an extensible markup language (XML) format and further to read and update entries in the directory information tree using DSMLv2 request and response tags with the Directory Extension Service 304. In an alternative embodiment, the functionality of the DSML server 306 may be included within the Directory Extension Service 304 itself.

The DSML server 306 communicates with a plurality of LDAP servers 308 via LDAPv3, for example. Each LDAP server 308 may communicate with a directory data store 102 to retrieve values in an attribute, the attributes in an entry, or the entries found in a search filter from a directory information tree stored in each directory data store 102. Each LDAP server 308 may communicate with the corresponding directory data store 102 in accordance with commands received by the DSML server 306. The results of queries to each of the directory data stores 102 are returned to the DSML server 306 and on to the Directory Extension Service 304 which may combine the results from all of the directory data stores 102 and reply the request from the client application 302. The client application 302 may simply display the results to a user of the client application 302, implement a function based on the results, or pass the results to another application. Any of the client application 302, a user, or another application may subsequently use the count results for a number of reasons, such as to administer licensing fees or optimize a directory data store to ensure efficient operation by redistributing entries across the data store or creating new branches in the directory data store if it is found that the number of entries on a branch is too large.

Figure 4:
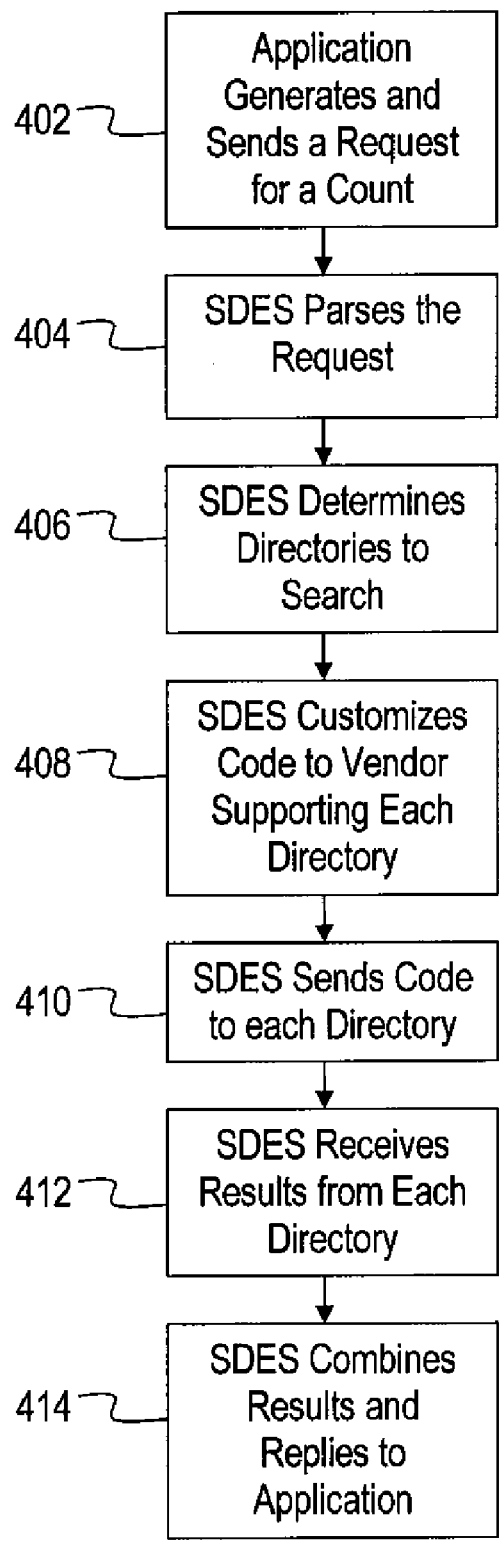
FIG. 4 shows an illustrative process of operation of the Directory Extension Service.

FIG. 4 depicts a flow chart describing the operation of the Directory Extension Framework 300. In block 402, a client application 302 may generate and send a request to the Directory Extension Service 304 for count values of a number of entries in a node and/or a number of entries in a node and any nested nodes according to a specified search filter. In block 404, the Directory Extension Service 304 may parse the request to identify each directory data store 102 specified in the request in block 406. Each directory data store 102 may be accessed via an LDAP server 308 which may be implemented by one of many different vendors. Each LDAP server vendor may support various proprietary operational attributes or proprietary LDAP controls. In block 408, the Directory Extension Service 304 may translate the parsed request to generate sets of commands to each directory data store 102 that may be particularly tailored according to operational attributes or LDAP controls supported by each vendor. This results in an efficient count of entries that takes advantage of all of the supported features of each LDAP vendor in a distributed environment. The operational attributes or LDAP controls may be described in a configuration file that is stored on the Directory Extension Service 304.

The Directory Extension Service 304 may use the configuration file to translate requests from the client application into DSML code that will efficiently retrieve the count values from each of the LDAP servers 308. The DSML code may then be run on a DSML server 306 which in turn communicates with the various LDAP servers 308 using LDAPv3. Each of the LDAP servers 308 communicates with their corresponding directory data store 102 to generate the desired count values in accordance with the code generated by the Directory Extension Service 304. The count values retrieved from each of the LDAP servers 308 may be retrieved by the Directory Extension Service 304 in block 410. In block 412, the Directory Extension Service 304 may then combine each of the retrieved count values and transparently present the resultant count value to the client application 302 in block 414.

For example, a count of the number of human resource employees in the enterprise depicted in FIG. 1 may be desired for determining software licensing fees. A client application 302 may then generate a request for generating a count of entries in any nodes identified by the relative distinguished name "Human Resources" and all of its nested nodes for each directory data store 102 in each of the three regions. Based on this request the Directory Extension Service 304 may parse the request to identify that entries in the directory data store 102 in each of the three regions are to be counted. The Directory Extension Service 304 may also identify the context from which to start the count in each of the directory data stores 102. For example, in region 1 the starting context may be identified as the distinguished name: ou=Human Resources, ou=Employees, o=Region1, c=US. Note that in the distinguished name ou stands for organizational unit, o stands for organization, and c stands for country. Note that the starting context for determining the count in each of the other regions may similarly be identified. The Directory Extension Service 304 may then generate code particularly tailored to the vendors implementing each of the directory data stores 102 in each of the regions. It is noted that each region's directory data store 102 may be implemented with different vendors. Upon receiving the count values from each of the directory data stores 102, the Directory Extension Service 304 may then combine the count values and transparently present the resultant count value of the number of human resource employees in the enterprise to the client application 302. Various examples of vendors and the operational attributes or LDAP controls that may be used for generating a more efficient count are described below.

Several LDAP server 308 vendors such as Netscape, Iplanet, Sun, and Novell support an operational attribute that stores a value corresponding to the number of immediate subordinates, or entries, in a node. Some of these vendors name the operation attribute "numSubordinates". Using this operational attribute, generating a count of the number of entries in a node and any nested nodes may be much more efficiently generated than by iteratively counting each entry.

Figure 5:
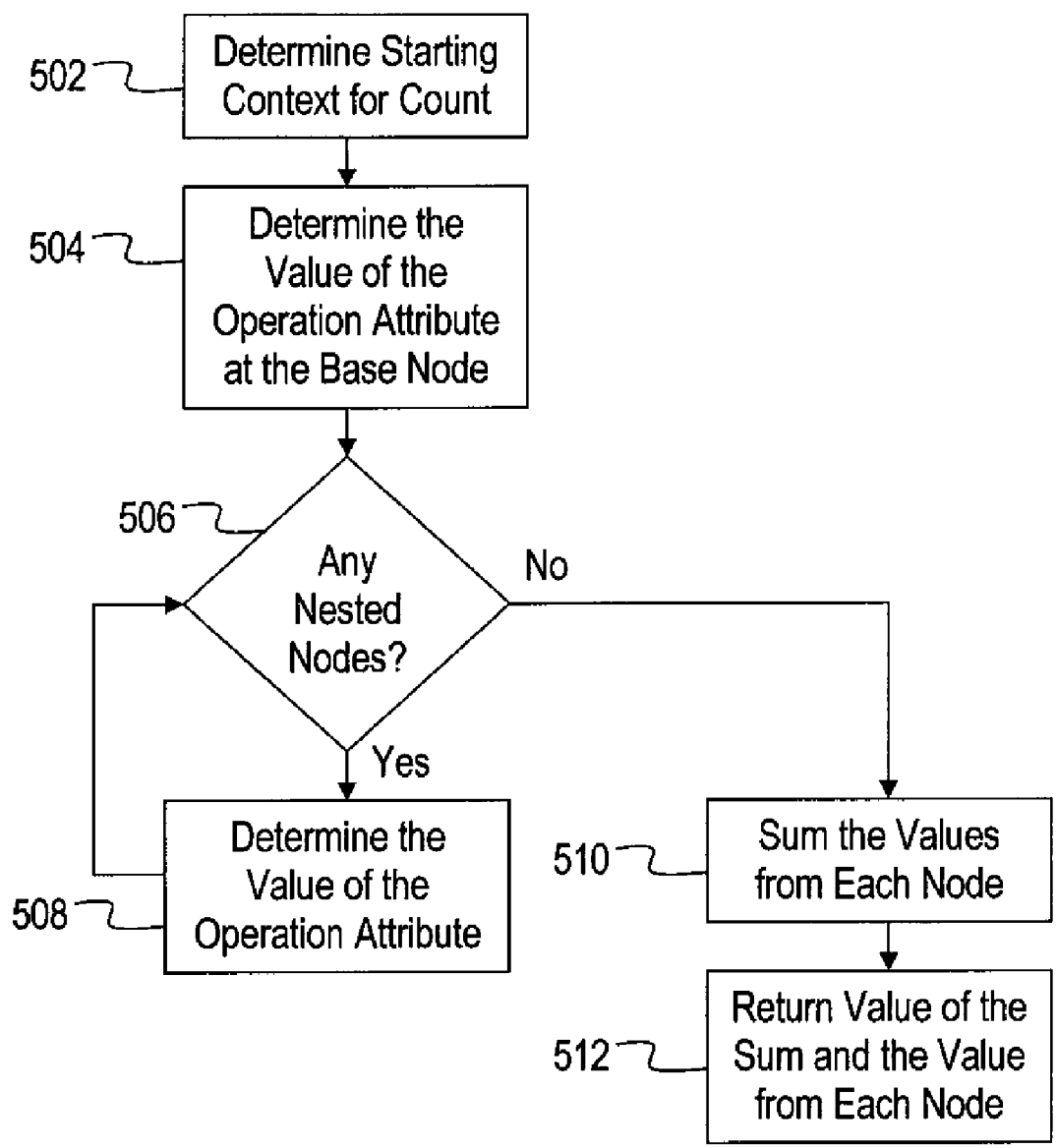
FIG. 5 shows an illustrative process for generating a count of a number of entries.

FIG. 5 describes an illustrative process for generating a count of a number of entries in a node and any nested nodes using the "numSubordinates" or similar operational attribute that counts entries but not nested nodes. Reference will be made to the directory information tree shown in FIG. 2 and the example described above of determining the number of human resource employees in the enterprise of FIG. 1.

At block 502, the starting context for the count of a number of entries in a node and any nested nodes is determined. In the human resource example, the starting context, or base node, was identified as the distinguished name: ou=Human Resources, ou=Employees, o=Region1, c=US. In block 504, a determination of the value stored in the operational attribute "numSubordinates" at the base node is made. In the directory information tree of FIG. 2, the value would be zero since there are no entries in that node. At block 506 it is determined whether or not there are any nested nodes. In the directory information tree of FIG. 2 there would be a positive determination that there are nested nodes, namely the managers, secretaries, and technicians nodes. In block 508, for each of the nested nodes, a determination of the value of the operational attribute "numSubordinates" would be made. In the directory information tree of FIG. 2, since the nodes of each of the job types store an entry for each employee falling under that job type, then the value of the operation attribute "numSubordinates" would provide a count of the number of human resource employees for each of the job types. Upon completing the determination in block 508, the process returns to block 506 to determine if any of the nested nodes in turn have any nested nodes. Blocks 506 and 508 would be repeated for any of the second and following levels of nested nodes in the directory information tree. In the directory information tree of FIG. 2 since the job type nodes are the leaf nodes (i.e., there are no additional nested nodes), then the process would proceed to block 510. In block 510 a sum of each of values retrieved from the operational attribute "numSubordinates" for the base node and any nested nodes would be made. Assuming that there are three managers, ten secretaries, and five technicians then the sum would be eighteen employees in human resources in region 1. In block 512 the value of the sum as well as the value of the operation attribute "numSubordinates" at each of the nodes may be returned to the Directory Extension Service 304. In the appendix section of this disclosure, code example 1 details an illustrative set of commands that the Directory Extension Service 304 may generate for retrieving a count value for any of the vendors that support operational attributes such as "numSubordinates".

One vendor, Siemens, supports an operational attribute that stores a value corresponding to the number of immediate subordinates as well as an operational attribute that stores a value corresponding to the number of all subordinated under a node. Siemens identifies these operational attributes as "numSubordinates" and "numAllSubordinates" respectively. Using these operational attributes, generating a count of the number of entries in a node and any nested nodes may be easily found. All that would need to be done is to read the value stored for each of the operational attributes "numSubordinates" and "numAllSubordinates" on the desired base node. For example, in the directory information tree of FIG. 2, a count of the number of employees in human resources in region 1 may simply be made by reading the value of the "numAllSubordinates" operational attribute stored in the human resources node.

Some vendors may not support any operational attributes, or any useful operational attributes for determining a count of the number of entries in a node and any nested nodes. For example, OpenLDAP supports an operational attribute "hasSubordinates" that specifies if a node is empty or not. While useful for some situations, this operation attribute may not be useful for generating efficient counts of entries. For some of these vendors there may be LDAP controls that are supported that are useful for efficiently generating a count of the number of entries in a node and any nested nodes.

One such LDAP control is the "PagedResultsControl". The "PagedResultsControl" allows the results of a search string to be returned in pages of a number of entries specified in the command. For example, a search of the number of employees in human resources may be performed wherein the resultant entries may be output in pages of 20 entries per page. This enables control of the rate at which an LDAP server 308 returns the results of a search string. By controlling the amount of data throughput, when searching through very large data sets the situation described in the background, of the LDAP server 308 crashing due to insufficient resources to handle the large amounts of data throughput, may be avoided.

In order to determine the count of the number of entries in a node and any nested node using "PagedResultsControl", equation 1 may be used:

$$E=(P-1)N+P_{last} \qquad \text{(Equation 1)}$$

In equation 1, E is the number of entries returned from the search operation, P is the number of pages returned, N is the number of entries per page, and $P_{last}$ is the number of entries in the last page. As shown in equation 1, the situation where the last page is not a full page, and the situation of only a partial page being returned is taken into account. In the appendix section of this disclosure, code example 2 details an illustrative set of commands that the Directory Extension Service 304 may generate for retrieving a count value for any of the vendors that support the LDAP control "PagedResultsControl". Other similar LDAP controls, such as a "Virtual List View" may also be used to generate an efficient count of the number of entries in a node and any nested nodes.

Some vendors may not support any useful operational attributes, or any useful LDAP controls to efficiently generating a count of the number of entries in a node and any nested nodes. In such a degenerate case, the process illustrated in FIG. 6 may be used to count directory information tree entries. Since this is not a typical usage pattern for directory data stores 102, the counting process is inefficient albeit useful to generate the desired count. To prevent or reduce memory resource constraints on the LDAP server 308, which may lead to the LDAP server 308 crashing, the directory data store 102 may be traversed in a "chunking" process.

Figure 6:
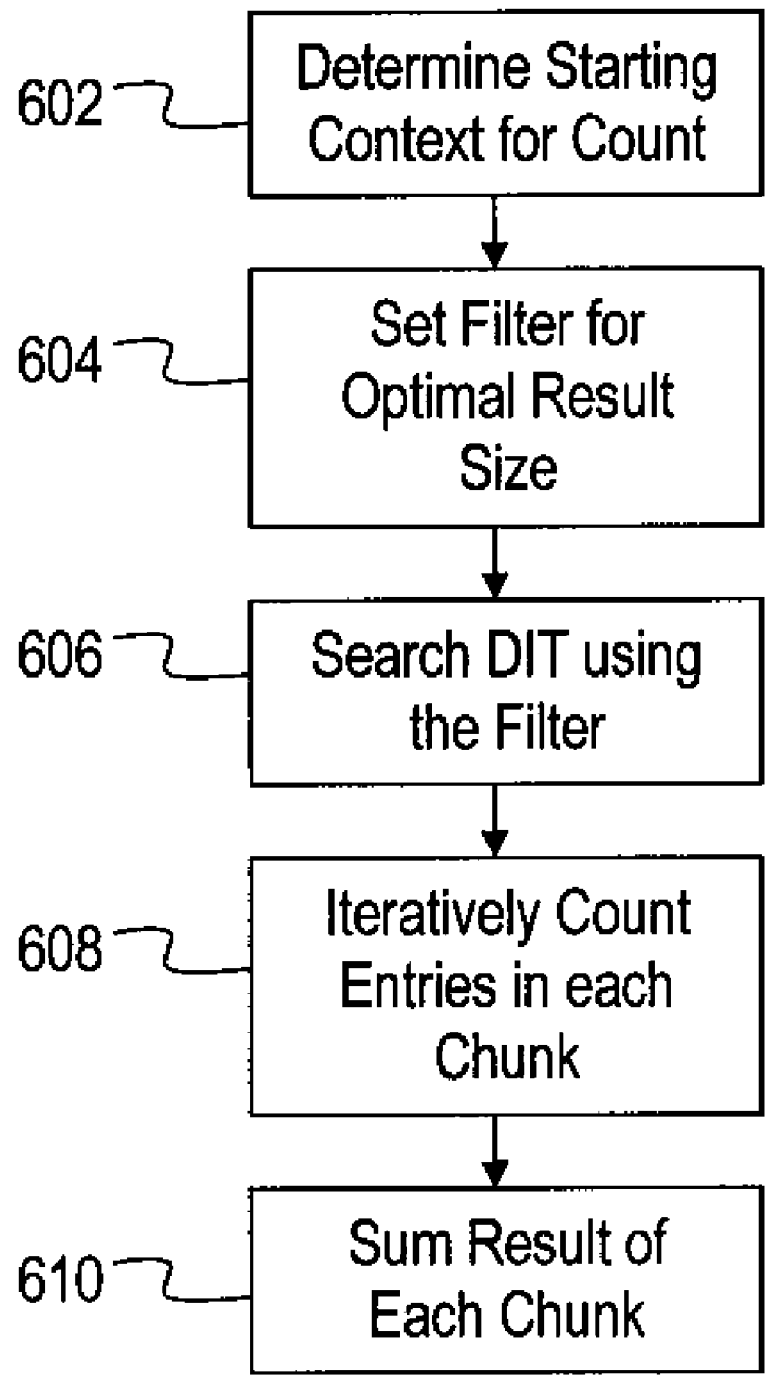
FIG. 6 shows another illustrative process for generating a count of a number of entries.

As shown in FIG. 6, a starting context for searching a directory information tree is determined in block 602. In block 604 a filter for a relative distinguished name (RDN) of the directory information tree is set such that an optimal result size is yielded. A simplified filter algorithm may be based on the common name (cn) of each entry, for example, cn=a*, cn=b*, cn=c*, etc. In this example, the filter allows chunking of the directory information tree based on the first character of the common name of an entry. Depending on how large and how balanced the directory is based on the RDNs, various custom search filter generators may be used to help optimize the result size of the searches. In block 606, the directory information tree is iteratively searched in accordance with the filter algorithm. For example, all of the entries with a common name starting with the letter "a" would be returned in the first search iteration, the entries with a common name starting with the letter "b" would be returned in the second search iteration, and so on. In block 608, the number of entries for each chunk is counted and in block 610 the results of each chunk are summed together.

Looking back to the example of generating a count of the number of human resource employees in the enterprise depicted in FIG. 1, it may be determined that the directory data store 102 of region 1 is supported by Netscape, the directory data store 102 of region 2 is supported by Siemens, and the directory data store 102 of region 3 is supported by a vendor that does not have any operational attributes or LDAP controls. As such, the Directory Extension Service 304 may translate the request to perform a search for the operational attribute "numSubordinates" for the human resources base node and each nested node in region 1, a search for the operational attributes "numSubordinates" and "numAllSubordinates" for the human resources base node in region 2, and the chunking search starting at the human resources base node in region 3. In this way a count of a number of entries in a plurality of directory data stores 102 operated by diverse vendors may be performed while taking advantage of supported features of each vendor.

In summary the Directory Extension Service system and method described above generates a count of a number of entries in a node or a number of entries in a node and any nested nodes in a plurality of directory data stores that are supported by diverse vendors. The Directory Extension Service parses count requests to generate one or more sets of commands that may be particularly tailored according to proprietary operational attributes or controls supported by each vendor. The count values retrieved from each of the directory data stores may be combined by the Directory Extension Service system and the resultant count value may be transparently presented to an application that has requested the count. This allows for not only efficient counting by taking advantage of proprietary operational attributes or controls, but counting across multiple directory data stores that may be implemented by a plurality of different vendors. Further, even in the case of a vendor not supporting any useful operational attributes or LDAP controls a chunking search may be performed in order to prevent or reduce memory resource constraints.

Figure 7:
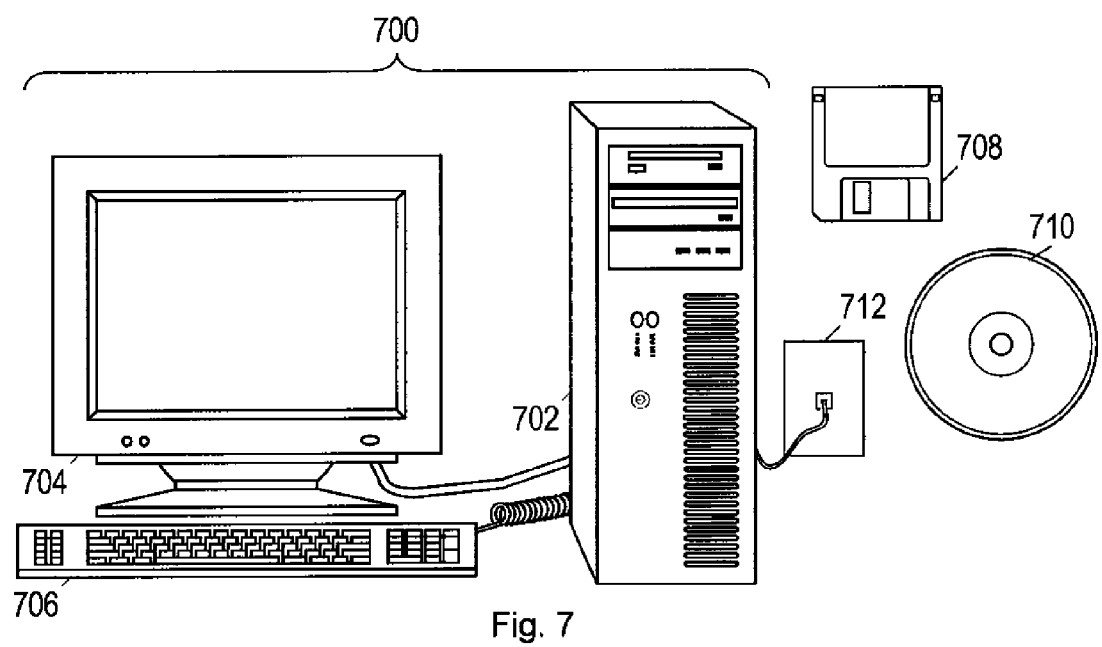
FIG. 7 shows an illustrative Directory Extension Service system embodied as a desktop computer.

FIG. 7 shows an illustrative system 700 for the Directory Extension Service. System 700 is shown as a desktop computer 700, although any electronic device having some amount of computing power coupled to a user interface may be configured to carry out the methods disclosed herein. Among other things, servers, portable computers, personal digital assistants (PDAs) and mobile phones may be configured to carry out aspects of the disclosed methods.

As shown, illustrative system 700 comprises a chassis 702, a display 704, and an input device 706. The chassis 702 comprises a processor, memory, and information storage devices. One or more of the information storage devices may store programs and data on removable storage media such as a floppy disk 708 or an optical disc 710. The chassis 702 may further comprise a network interface that allows the system 700 to receive information via a wired or wireless network, represented in FIG. 7 by a phone jack 712. The information storage media and information transport media (i.e., the networks) are collectively called "information carrier media."

The chassis 702 is coupled to the display 704 and the input device 706 to interact with a user. The display 704 and the input device 706 may together operate as a user interface. The display 704 is shown as a video monitor, but may take many alternative forms such as a printer, a speaker, or other means for communicating information to a user. The input device 706 is shown as a keyboard, but may similarly take many alternative forms such as a button, a mouse, a keypad, a dial, a motion sensor, a camera, a microphone or other means for receiving information from a user. Both the display 704 and the input device 706 may be integrated into the chassis 702.

Figure 8:
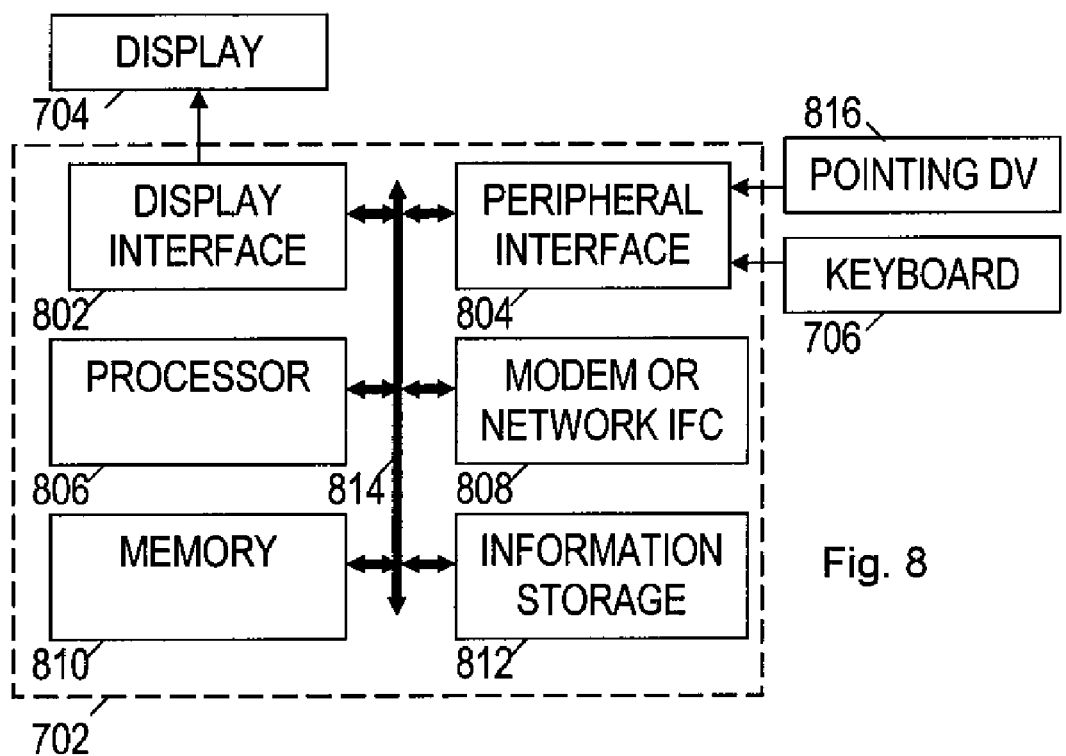
FIG. 8 shows a block diagram of an illustrative Directory Extension Service system.

FIG. 8 shows a simplified functional block diagram of system 700. The chassis 702 may comprise a display interface 802, a peripheral interface 804, a processor 806, a modem or other suitable network interface 808, a memory 810, an information storage device 812, and a bus 814. System 700 may be a bus-based computer, with the bus 814 interconnecting the other elements and carrying communications between them. The display interface 802 may take the form of a video card or other suitable display interface that accepts information from the bus 814 and transforms it into a form suitable for the display 704. Conversely, the peripheral interface 804 may accept signals from the keyboard 706 and other input devices such as a pointing device 816, and transform them into a form suitable for communication on the bus 814.

The processor 806 gathers information from other system elements, including input data from the peripheral interface 804, and program instructions and other data from the memory 810, the information storage device 812, or from a remote location via the network interface 808. The processor 806 carries out the program instructions and processes the data accordingly. The program instructions may further configure the processor 806 to send data to other system elements, comprising information for the user which may be communicated via the display interface 802 and the display 704.

The network interface 808 enables the processor 806 to communicate with remote systems via a network. The memory 810 may serve as a low-latency temporary store of information for the processor 806, and the information storage device 812 may serve as a long term (but higher latency) store of information.

The processor 806, and hence the computer 700 as a whole, operates in accordance with one or more programs stored on the information storage device 812. The processor 806 may copy portions of the programs into the memory 810 for faster access, and may switch between programs or carry out additional programs in response to user actuation of the input device. The additional programs may be retrieved from information the storage device 812 or may be retrieved from remote locations via the network interface 808. One or more of these programs configures system 700 to carry out at least one of the Directory Extension Service methods disclosed herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

APPENDIX

Figure 9:
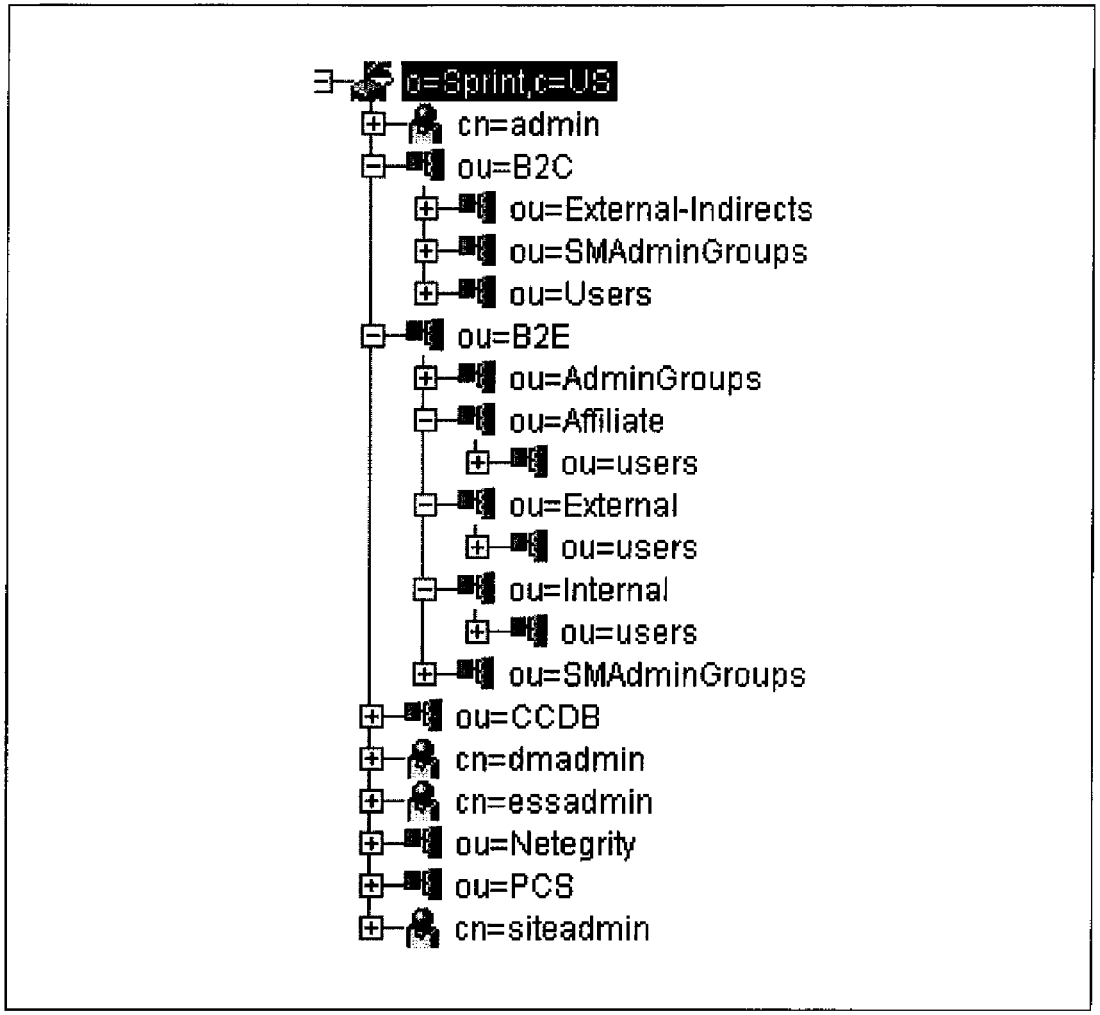
FIG. 9 shows an illustrative Directory Information Tree for the code examples in the Appendix.

The following code examples are made in reference to the example directory information tree depicted in FIG. 9.

Code Example 1

Here is a sample program that may be generated by the Directory Extension Service 304 to determine the subordinate/nested subordinates count for vendors that support an operational attribute that stores a count of a number of entries in a node. In this code example the operational attribute is called "numSubordinates". As noted above, using this type of operational attribute, all that needs to be done is search for the operational attribute "numSubordinates" in each node and nested node and sum the results to generate a count of all of the entries. The program below is written using JNDI API:

```
import javax.naming.directory.InitialDirContext;
import javax.naming.ldap.InitialLdapContext;
import javax.naming.directory.DirContext;
import javax.naming.ldap.LdapContext;
import javax.naming.directory.SearchResult;
import javax.naming.directory.SearchControls;
import javax.naming.directory.Attributes;
import javax.naming.directory.Attribute;
import javax.naming.Context;
import javax.naming.NamingException;
import javax.naming.NamingEnumeration;
import java.util.Hashtable;
import java.util.Properties;
import java.util.StringTokenizer;
import java.io.ByteArrayInputStream;
import java.io.IOException;
import java.math.BigInteger;
/**
 * This class when executed will provide a count /nested count under a given node.
 *
 */
public class DirxNestedNodesCount{
```

-continued

```
    private static final String CLASS = "DirxNestedNodesCount";
    public static final String D00N0515_DIRX= "ldap://207.40.170.83:389/o=sprint,c=us";
    public static final String NUM_SUBORDINATES = "numSubordinates";
    public static final String NUM_ALL_SUBORDINATES = "numAllSubordinates";
    private static DirContext ctx = null;
    private static String[ ] attrIDs = {NUM_SUBORDINATES};
public static void main(String[ ] args)throws Exception{
    String method="main";
    String errMsg="";
    Hashtable env = new Hashtable( );
    env.put(Context.INITIAL_CONTEXT_FACTORY,
        "com.sun.jndi.ldap.LdapCtxFactory");
    env.put(Context.PROVIDER_URL,D00N0515_DIRX);
    env. put(Context.SECURITY_AUTHENTICATION,"simple");
    env.put(Context.SECURITY_PRINCIPAL,"cn=admin,o=sprint,c=us");
    env.put(Context.SECURITY_CREDENTIALS,"dirx");
    ctx = new InitialDirContext(env);
    String relativeDN=args[0];
    SearchControls searchControls = new SearchControls( );
    searchControls.setSearchScope(SearchControls.SUBTREE_SCOPE);
    String filter = "objectClass=OrganizationalUnit";
    NamingEnumeration searchList = ctx.search(relativeDN,filter,searchControls);
    if (searchList != null){
        System.out.println ("Total count under " + args[0] + " = " +
retrieveAndDisplaySearchResult(searchList,relativeDN));
    }
    ctx.close( );
}
/**
 * Retrieves and returns the subordinate count under a node.
 *
 * @param attrs attributes
 * @exception Exception is thrown if failed to retrieve the attribute info.
 */
    private static int retrieveAndDisplayAttrs(Attributes attrs) throws Exception{
        String method=" retrieveAndDisplayAttrs ";
        String errMsg="";
        try {
            NamingEnumeration ae = attrs.getAll( );
            if (ae.hasMore( )) {
                Attribute attr = (Attribute) ae.next( );
                System.out.println("numSubordinates = " + attr.get( ));
                return Integer.parseInt((String)attr.get( ));
            }
        }catch (Exception e) {
            errMsg = "Failed to retrieve the attributes. Details (" + e.getMessage( ) + ")";
            log(CLASS,method,errMsg + e);
            throw new Exception(errMsg);
        }
        return 0;
}
/** Computes the total count of all immediate /nested
 * subordinates contained under a node
 *
 * @param ae enumeration of search result objects
 * @param rdnSuffix the rdn suffix
 * @exception Exception is thrown if failed to retrieve value
 */
    private static int retrieveAndDisplaySearchResult(Naming Enumeration ae,String rdnSuffix)
throws Exception{
    String method="retrieveAndSetCRL";
    String errMsg="";
    int numAllSubordinates = 0;
    try {
        while (ae.hasMore( )) {
            SearchResult searchResult = (SearchResult) ae.next( );
            StringTokenizer token = new StringTokenizer( searchResult.toString( ), ":");
            String relativeDN = (String)token.nextToken( );
            if (!relativeDN.endsWith("null")) {
                System.out.println (relativeDN);
                Attributes attrs = ctx.getAttributes(relativeDN+ "," + rdnSuffix, attrIDs);
                if (attrs == null || attrs.size( ) == 0){
                    errMsg="None of the attributes with " + attrIDs + " exist";
                    log(CLASS,method,errMsg);
                    throw new Exception(errMsg);
                }
                numAllSubordinates = numAllSubordinates + retrieveAndDisplayAttrs(attrs);
            }
        }
```

```
    }catch (Exception e) {
        errMsg = "Failed to retrieve the attributes. Details (" + e.getMessage( ) + ")";
        log(CLASS,method,errMsg + e);
        throw new Exception(errMsg);
    }
    return numAllSubordinates;
    }
    /**
    * Logs the message.
    *
    * @param cl class name
    * @param mt method name
    * @param msg message
    *
    */
    private static void log (String cl, String mt, Object msg){
        //System.out.println (cl + "->" + mt + "->" + msg);
    }
}
```

The output from running the code above is:

```
OUTPUT:
/home2/vcheru01/patent-demos>java DirxNestedNodesCount "ou=B2E"
ou=Internal
numSubordinates = 1
ou=External
numSubordinates = 1
ou=SMAdminGroups
numSubordinates = 0
ou=Affiliate
numSubordinates = 1
ou=users,ou=Internal
numSubordinates = 0
ou=users,ou=Affiliate
numSubordinates = 10
ou=users,ou=External
numSubordinates = 1253
ou=AdminGroups
numSubordinates = 21
Total count under ou=B2E = 1287
```

Code Example 2

Here is a sample program to determine the subordinate/nested subordinates count for vendors that support the LDAP control "PagedResultsControl". The program below is written using JNDI API:

```
import javax.naming.directory.InitialDirContext;
import javax.naming.ldap.InitialLdapContext;
import javax.naming.directory.DirContext;
import javax.naming.ldap.Control;
import javax.naming.ldap.PagedResultsControl;
import javax.naming.ldap.PagedResultsResponseControl;
import javax.naming.ldap.LdapContext;
import javax.naming.directory.SearchResult;
import javax.naming.directory.SearchControls;
import javax.naming.directory.Attributes;
import javax.naming.directory.Attribute;
import javax.naming.Context;
import javax.naming.NamingException;
import javax.naming.NamingEnumeration;
import java.util.Hashtable;
import java.util.Properties;
import java.util.StringTokenizer;
import java.io.ByteArrayInputStream;
import java.io.IOException;
import java.math.BigInteger;
public class PagedSearch
{
    public static final String D00N0515_DIRX= "ldap://207.40.170.83:389/o=sprint,c=us";
    public static void main (String[ ] args) throws Exception
    {
        Hashtable env = new Hashtable( );
        env.put(Context.INITIAL_CONTEXT_FACTORY,
            "com.sun.jndi.ldap.LdapCtxFactory");
        env.put(Context.PROVIDER_URL,D00N0515_DIRX);
        env.put(Context.SECURITY_AUTHENTICATION,"simple");
        env.put(Context.SECURITY_PRINCIPAL,"cn=admin,o=sprint,c=us");
        env.put(Context.SECURITY_CREDENTIALS,"dirx");
        LdapContext ldapContext = new InitialLdapContext(env, null);
```

-continued

```
    String searchBase = args[0];
    String filter = "objectclass=*";
    int pageSize = Integer.parseInt(args[1]);
    SearchControls searchControls = new SearchControls( );
    searchControls.setSearchScope(SearchControls.SUBTREE_SCOPE);
    searchControls.setReturningAttributes(new String[ ] {"dn"});
    int entryIndex = 0;
    byte[ ] cookie = null;
    int page = 1;
    ldapContext.setRequestControls(new Control[ ] {new
PagedResultsControl(pageSize,Control.CRITICAL)});
        do
        {
           System.out.println ("Page" + page);
           NamingEnumeration ne = ldapContext.search(searchBase, filter, searchControls);
           while(ne.hasMoreElements( )) {
              SearchResult searchResult = (SearchResult)ne.next( );
              System.out.println(++entryIndex + ": " + searchResult);
           }
           page++;
           // Pauses for 2 seconds between pages
              Thread.sleep (2000);
           cookie =
           ((PagedResultsResponseControl)ldapContext.getResponseControls( )[0]).getCookie( );
           if(cookie != null) {
        ldapContext.setRequestControls(new Control[ ] {new PagedResultsControl(pageSize,
cookie, Control.CRITICAL)});
        }
     } while(cookie != null);
   }
}
```

A portion of the output from running the code above is:

```
OUTPUT
/home2/vcheru01/patent-demos>java PagedSearch "ou=b2e" 10
Page 1
1: : null:null:No attributes
2: ou=Internal: null:null:No attributes
3: ou=External: null:null:No attributes
4: ou=SMAdminGroups: null:null:No attributes
5: ou=Affiliate: null:null:No attributes
6: ou=users,ou=Internal: null:null:No attributes
7: ou=users,ou=Affiliate: null:null:No attributes
8: ou=users,ou=External: null:null:No attributes
9: ou=AdminGroups: null:null:No attributes
10: cn=SUAT.AdminGroup,ou=AdminGroups: null:null:No attributes
Page 2
11: cn=HierMgr.AdminGroup,ou=AdminGroups: null:null:No attributes
12: cn=servicepro.SuperAdminGroup,ou=AdminGroups: null:null:No
attributes
13: cn=MCA.AdminGroup,ou=AdminGroups: null:null:No attributes
14: cn=id2brand.AdminGroup,ou=AdminGroups: null:null:No attributes
15: cn=servicepro.AdminGroup,ou=AdminGroups: null:null:No attributes
16: cn=TransMon.AdminGroup,ou=AdminGroups: null:null:No attributes
17: cn=SynchPoint.AdminGroup,ou=AdminGroups: null:null:No attributes
18: cn=tmp.AdminGroup,ou=AdminGroups: null:null:No attributes
19: cn=HCM.AdminGroup,ou=AdminGroups: null:null:No attributes
20: cn=Lightsurf.AdminGroup,ou=AdminGroups: null:null:No attributes
Page 3
21: cn=DMT.AdminGroup,ou=AdminGroups: null:null:No attributes
22: cn=loadplus.AdminGroup,ou=AdminGroups: null:null:No attributes
23: cn=EWO.AdminGroup,ou=AdminGroups: null:null:No attributes
24: cn=arlba.AdminGroup,ou=AdminGroups: null:null:No attributes
25: cn=upa.AdminGroup,ou=AdminGroups: null:null:No attributes
26: cn=upa.SuperAdminGroup,ou=AdminGroups: null:null:No attributes
27: cn=ECP.AdminGroup,ou=AdminGroups: null:null:No attributes
28: cn=LMSExtIndirects.AdminGroup,ou=AdminGroups: null:null:No
attributes
29: cn=SOX.AdminGroup,ou=AdminGroups: null:null:No attributes
30: cn=SNIP.AdminGroup,ou=AdminGroups: null:null:No attributes
```

What is claimed is:

1. A system comprising:
   a directory extension service unit stored as a set of computer instructions on a computer readable storage medium and executable by a processor configured to:
   communicate with a plurality of hierarchical directory data stores, wherein each of the plurality of hierarchical directory data stores is supported by one of a plurality of vendors,
   translate a count request received from a client application into a plurality of sets of commands, wherein each of the plurality of sets of commands corresponds with one of the plurality of hierarchical directory data stores, and wherein each of the plurality of sets of commands is translated to utilize features of a corresponding one of the plurality of vendors to generate a count value of a number of entries in the corresponding one of the plurality of hierarchical directory data stores,
   sum together the count value from each of the plurality of hierarchical directory data stores to produce a resultant count value, and
   communicate the resultant count value to the client application.

2. The system of claim 1, further comprising:
   a directory service markup language (DSML) server configured to communicate with a plurality of lightweight directory access protocol (LDAP) servers,
   wherein each of the plurality of LDAP servers interfaces with one of the plurality of hierarchical directory data stores, and
   wherein the directory extension service unit communicates with each of the plurality of hierarchical directory data stores through the DSML server and a corresponding one of the plurality of LDAP servers.

3. The system of claim 2, wherein:
   the translation is performed in accordance with a configuration file stored on the directory extension service unit.

4. The system of claim 3, wherein:
the features include at least one of operational attributes and LDAP controls.

5. The system of claim 4, wherein:
the operational attributes store at least a value of the number of entries in a node.

6. The system of claim 5, wherein:
the operation attributes also store a value of the number of entries in a node and any nested nodes.

7. The system of claim 4, wherein:
the LDAP controls include at least one of a paged results control and a virtual list view control.

8. A method comprising:
receiving a request for a count of a number of entries in a plurality of hierarchical directory data stores;
translating the request into a plurality of sets of commands, wherein each of the plurality of sets of commands corresponds with one of the plurality of hierarchical directory data stores, and wherein each of the plurality of sets of commands is translated to use features supported by a corresponding one of a plurality of vendors of the plurality of hierarchical directory data stores;
receiving a count a number of entries on each of the plurality of hierarchical directory data stores in accordance with a corresponding one of the plurality of sets of commands;
summing all of the number of entries on each of the plurality of hierarchical directory data stores to generate the count of a number of entries in the plurality of hierarchical directory data stores.

9. The method of claim 8, wherein:
a feature of the features of at least one of the plurality of hierarchical directory data stores is an operational attribute for storing a value of the number of entries in a node.

10. The method of claim 9, wherein:
the counting for the at least one of the plurality of hierarchical directory data stores is accomplished through reading the value of the operation attribute at a base node and any nested nodes and summing the read values at each of the nodes.

11. The method of claim 8, wherein:
the feature of at least one of the plurality of hierarchical directory data stores is a first operational attribute for storing a value of a number of entries in a node and a second operation attribute for storing a value of a number of entries in a node and any nested nodes.

12. The method of claim 11, wherein:
the counting for the at least one of the plurality of hierarchical directory data stores is accomplished through reading the value of the second operation attribute.

13. The method of claim 8, wherein:
the feature of at least one of the plurality of hierarchical directory data stores is a paged results LDAP control.

14. The method of claim 13, wherein:
the counting for the at least one of the plurality of hierarchical directory data stores is accomplished through adding a number of entries returned on a last page to a result of multiplying one less than a number of pages returned by a number of entries on each page.

15. The method of claim 8, wherein:
a feature of at least one of the plurality of hierarchical directory data stores is not useful for determining the number of entries.

16. The method of claim 15, wherein:
the counting for the at least one of the plurality of hierarchical directory data stores is accomplished through dividing the at least one of the plurality of hierarchical directory data stores into a plurality of optimally sized chunks in accordance with a search filter, iteratively counting a number of entries for each chunk, and summing the number of entries from all of the chunks.

17. A computer readable storage medium containing computer instructions that, when executed by a computing device, cause the computing device to:
receive a request for a count of a number of entries from an application;
parse the request to determine a plurality of hierarchical directory data stores from which a count of entries is requested and to determine a plurality of vendors that correspond with the plurality of hierarchical directory data stores;
translate the request into a plurality of sets of commands, wherein each of the plurality of sets of commands corresponds with one of the plurality of hierarchical directory data stores, and wherein each of the plurality of sets of commands is translated to use features supported by a corresponding one of the plurality of vendors of the plurality of hierarchical directory data stores;
communicate each of the plurality of sets of commands to a corresponding one of the plurality of hierarchical directory data stores;
receive a count of a number of entries from each of the plurality of hierarchical directory data stores in accordance with a corresponding one of the plurality of sets of commands;
reply to the application with a sum of the counts of a number of entries received from all of the plurality of hierarchical directory data stores.

18. The computer readable storage medium of claim 17 further containing instructions that cause the computing device to:
read entries from a configuration file corresponding to the vendor of each of the plurality of hierarchical directory data stores; and
translate the request in accordance with the entries of the configuration file.

19. The computer readable storage medium of claim 18 further containing instructions that cause the computing device to:
parse the request to determine a context from which to start the count in each of the plurality of hierarchical directory data stores.

* * * * *